July 31, 1945.  J. G. TYKEN  2,380,559
BLOCKER SYNCHRONIZER
Filed Sept. 11, 1941
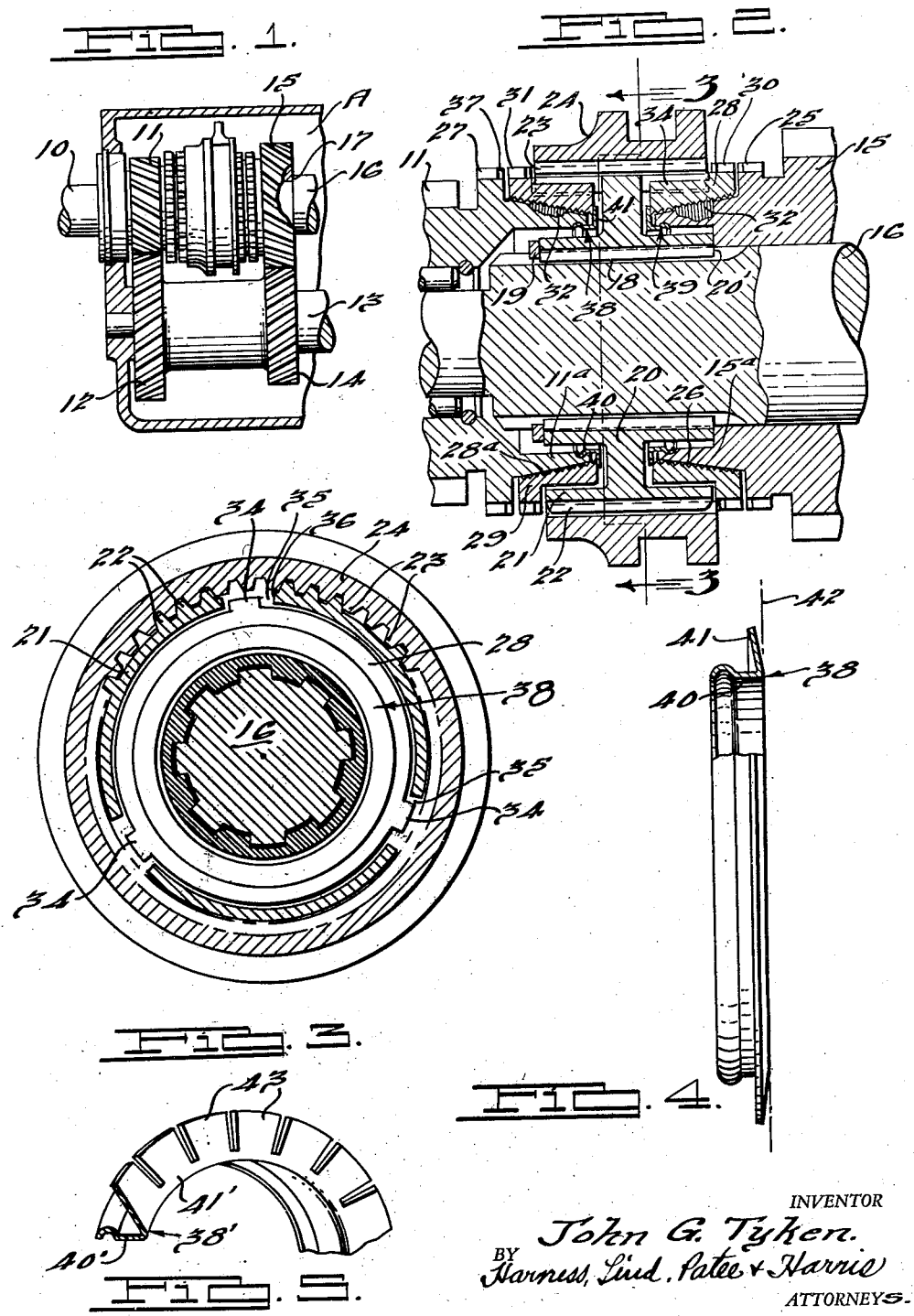
INVENTOR
John G. Tyken.
BY
Harness, Lind, Patee & Harris
ATTORNEYS.

Patented July 31, 1945

2,380,559

UNITED STATES PATENT OFFICE 2,380,559

BLOCKER SYNCHRONIZER

John G. Tyken, Detroit, Mich., assignor to Chrysler Corporation, Highland Park, Mich., a corporation of Delaware Application September 11, 1941, Serial No. 410,399

5 Claims. (Cl. 192—53)

This invention relates to blocker synchronizers for clutching mechanisms and is a continuation-in-part of my application Serial No. 278,683, filed June 12, 1939.

The improved clutching mechanism is illustrated and described in connection with a speed ratio control device including members adapted for positive clutching engagement, the mechanism being operable to block such engagement when the members to be clutched are operating at relatively different speeds and to accommodate engagement thereof when the members are operating at approximately the same speed. The mechanism includes a blocker adapted to frictionally engage one of the members to be clutched and having a lost motion driving connection with the other of these members to accommodate a clocking action of the blocker with respect thereto in order that the blocker can move between its blocking and non-blocking positions to thereby respectively prevent and accommodate clutching of the members.

In order to insure disposition of the blocker in its blocking position when the members to be clutched are operating at relatively different speeds it is desirable that the blocker engage the non-driving member under relatively light pressure a sufficient amount to establish a dragging action between the latter member and the blocker prior to initiating the clutching operation. The blocker member is adapted to frictionally engage the non-driving member under relatively heavy pressure to effect synchronization of the members to be clutched.

It is therefore an object of my invention to provide a mechanism for effecting positively clutching engagement between members wherein a blocker has a driving connection with one of these members and is frictionally engageable with the other thereof, together with improved means for placing the blocker in relative light frictional engagement with the other of these members prior to initiating the operation for effecting clutching engagement of the members.

A further object of the invention is to provide means of the foregoing type which thrusts the blocker axially to effect the aforesaid relatively light frictional engagement.

Another object of the invention is to provide improved means for retaining the blocker in assembled position and which is operable to thrust the blocker into relatively light blocker-energizing pressure with that member with which it is frictionally engageable.

A still further object is to provide yieldable blocker-energizing means acting between one of the members to be clutched and the blocker for exerting an axial thrust therebetween to induce positioning of the blocker in its blocking position prior to initiating the clutching operation.

Other objects and advantages of the invention will be more apparent from the following description taken in connection with the accompanying drawing in which:

Fig. 1 is a sectional elevational view of a portion of a standard transmission with my invention applied thereto.

Fig. 2 is an enlarged sectional elevational view of a portion of the Fig. 1 transmission showing the blocker synchronizer.

Fig. 3 is a transverse sectional view taken as indicated by line 3—3 of Fig. 2.

Fig. 4 is an elevational view partly in section of the blocker energizing and retaining ring shown in Fig. 2.

Fig. 5 is a fragmentary perspective view of a modified form of the Fig. 4 ring.

In the drawing I have illustrated my invention in connection with the second and direct speed drives of a conventional transmission A although my blocker synchronizer may be used wherever blocker clutching is desired.

The transmission comprises the usual driving shaft 10 which carries the main drive pinion 11 meshing with countershaft gear 12. The countershaft 13 carries a gear 14 meshing with the second speed gear 15 which is loose on the transmission output shaft 16 and retained against axial displacement to the right, as viewed in Fig. 1, by shoulder 17 on shaft 16.

Splined at 18 to shaft 16 and preferably fixed by rings 19 and shoulder 20' against movement axially of this shaft is a hub 20 having an outer annular rim 21 extending axially beyond the body portion of the hub and formed with a series of axially extending external teeth 22 engaged by the internal teeth 23 of a shift clutch member or sleeve 24. The gear 15 has axial clearance approximating that of a normal good running bearing fit.

Gear 15 has a forwardly extending portion 15ª formed with a series of external clutching teeth 25 and a friction clutching cone surface 26. Gear 11 likewise has a rear extension 11ª formed with clutching teeth 27 and cone surface 28ª, the sleeve teeth 23 being selectively engageable either with teeth 25 or 27 when the sleeve 24 is shifted rearwardly or forwardly to respectively drive shaft 16 from shaft 10 in the second or direct speed ratios.

As a means for frictionally synchronizing shaft 16 and hub 20 with gear 15 or gear 11 and preventing the positive clutching of the sleeve 24 with teeth 25 or 27 prior to synchronization, I provide blocker synchronizers in the form of rings 28, 29 respectively formed with blocker teeth 30, 31 of the same diametrical pitch as the teeth 23, 25 and 27 and respectively disposed between teeth 23 and teeth 25 and 27 as shown in Fig. 2 so that the blocker teeth will prevent shift of the sleeve until the parts to be positively clutched are synchronized.

Each blocker 28, 29 is formed with a cup 32 preferably threaded to provide a friction surface which will cut through the oil film at the cones 26, 28ª without grooving the cones. The threads are preferably of a left hand to assist in the release of the blockers after they perform their functions. The blockers 28, 29 are respectively mounted on the cone portions of gears 15 and 11. The blocker 28 has a plurality (three being shown) of circumferentially spaced radially projecting stops 34 each projecting with clearance 35 into an opening 36 formed by milling a radial slot through the portion of rim 21 which axially overhangs the body of the hub 20, and the same arrangement is provided with respect to blocker 29 and rim 21. The various teeth 30, 31, 25, 27 have their ends bevelled at 37 for contact with bevelled ends of sleeve teeth 23.

In the illustrated position of the various parts, the friction surfaces at the threads 32 of the blockers 28, 29 have slight radial clearance with the cones 26 and 28ª respectively approximating that of a normal good running bearing fit and accommodating the presence of an oil film therebetween. Each blocker member has its sole support on the associate cone and the oil film as aforesaid will tend to cause the blockers 28, 29 to be rotatably dragged with their respective gears 11 and 15 whereby the stops 34 engage one side or the other of their associated slots 36, thus maintaining the teeth 30, 31 out of axial alignment with the teeth 23 to insure the desired blocking action whenever the hub 20 is rotating at a speed different from the speed of rotation of either gear 11 or gear 15.

In the manufacture and assembly of the transmission parts various tolerances are permitted and it has been found desirable to provide means to insure the foregoing rotatable dragging action of the blockers with respect to their associated cones, such means preferably operating to thrust the blockers axially to engage the associated cone friction surface under relatively light pressure, hereinafter referred to as blocker energizing pressure. This permits the necessary manufacturing tolerances which are incident to a mechanism of this type.

The blockers 28, 29 are retained in assembled position and in the aforesaid energizing engagement with their associated cones by snap rings generally designated by the numerals 38 and 39, respectively, preferably made of spring steel, the construction and operation of which are the same and for brevity the description will be limited to ring 38. The ring 38 is non-rotatably carried by the gear 11 and has an axial flange 40 provided with an arcuately shaped portion which is seated in and frictionally engages a correspondingly shaped annular groove in the radially inner face of the cone 11ª. Integral with the flange 40 and disposed angularly with respect thereto is a generally radially extending flange 41 spaced from the end face of the cone 11ª and engaging the end face of the blocker member 29, the latter end face extending axially beyond and overhanging the blocker end face. For the purpose of illustration this overhang is slightly exaggerated, it being understood that axial movement of the blocker on its cone is very slight in the present embodiment.

The normal relative positions of the ring flanges 40 and 41 are shown in Fig. 4, the flange 41 being springingly deflected to the dotted line position designated by the numeral 42 when the ring is in its assembled position as shown in Fig. 2. The tendency of the flange 41 to return to its normal position provides an axial thrust directed against the blocker to cause the latter to engage the cone friction surface under such pressure as is sufficient to establish the aforesaid blocker energizing pressure and cause the blocker to be rotatably dragged with the gear 11 and maintained in blocking relation prior to shift of the sleeve 24 to effect clutching engagement with either the gear 11 or the gear 15.

Upon shift of the sleeve axially and forwardly to clutch with the teeth 27 of gear 11 the blocker will have been previously disposed in blocking position in the aforesaid manner and the sleeve teeth 23 will engage the cammed ends of the blocker teeth 31 to cause the blocker surface 32 to engage the friction surface 28ª of the cone 11ª under relatively heavy pressure to synchronize the speeds of the parts 11 and 24. As soon as synchronization occurs the pressure of the teeth against the blocker teeth rotate the blocker to dispose the blocking teeth in axial alignment with the teeth 23 to permit the latter to engage the teeth 27 without clashing or damaging these teeth.

The blocker 28 is mounted on extension 15ª of gear 15 and controls rearward shift of the sleeve 24 in the manner set forth with respect to blocker 29, the blocker being maintained in blocker energizing engagement with the cone surface 26 by the ring 39 operating as does the ring 38. It will be understood that the mechanism herein may be so utilized that the blocker members 28, 29 perform a blocking function independently of the synchronizing function.

Referring to Fig. 5, the ring 38' is similar to the rings 38 and 39 but differs therefrom in that the flange 41' comprises a plurality of spring fingers 43.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a synchronizing device of the character described, a first rotatable structure including external clutching teeth and a hollow terminal part having an external friction surface and an end face, a second rotatable structure having external teeth, a blocker member mounted on said hollow part having a friction surface engageable with the aforesaid friction surface and blocker teeth axially between the teeth of said first and second structures, means for driving said blocker member from said second structure with clearance accommodating limited rotation of the blocker member relative to said second structure, a sleeve having internal teeth engaging the external teeth of said second structure and shiftable to clutchingly engage the teeth of said first structure, the ends of said blocker teeth engaging the ends of the teeth of said sleeve and preventing shift of said sleeve into said clutching engagement prior to approximate synchronization of said structures, and a single ring-like member so frictionally engaged with the internal surface of said hollow part as to rotate with said first structure and having a part thereof overlapping said end face and engaged in thrust transmitting relationship with said blocker member to yieldingly thrust the latter axially with respect to the direction of rotation of the first friction surface.

2. In a power transmitting mechanism including driving and driven structures adapted to be positively clutched; one of said structures having a set of clutch teeth, a friction surface and an opening therein at said friction surface spaced from said teeth, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker member in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a single blocker energizing member having a first part extending into the opening of said one structure and so engaged with the latter as to rotate therewith and having a second part engaged with said blocker member for yieldably thrusting the latter axially into said blocker-energizing engagement with said friction surface whereby to induce said positioning of said blocker member in said blocking relationship prior to clutching shift of said clutching sleeve.

3. In a power transmitting mechanism including driving and driven structures adapted to be positively clutched; one of said structures having a set of clutch teeth and a friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker means in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a snap ring having an axial flange so engaging said first one of said structures as to rotate with the latter and a radial spring flange engaging said blocker member operating to yieldably urge the latter axially into said blocker-energizing engagement with said friction surface whereby to induce said positioning of said blocker member in said blocking relationship prior to clutching shift of said clutching sleeve.

4. In a power transmitting mechanism including driving and driven structures adapted to be positively clutched; one of said structures having a set of clutch teeth and a radially outer friction surface and a radially inner surface provided with a groove, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker member in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a blocker energizing member comprising a flange having a beaded portion thereof seated in the groove of said inner surface and another flange engaging an end face of said blocker member whereby to yieldably thrust the latter axially into said blocker-energizing engagement with said friction surface to induce said positioning of said blocker member in said blocking relationship prior to clutching shift of said clutching sleeve, one of said flanges comprising a plurality of spring-like segments.

5. In a power transmitting mechanism including driving and driven structures adapted to be positively clutched; one of said structures having a set of clutch teeth and a hollow part having an external friction surface, a clutching sleeve drivingly carried by the other of said structures and shiftable axially to clutch with said teeth, a blocker member adapted to engage said friction surface under relatively light blocker-energizing pressure and having blocker means, said blocker member having a rotatable connection with said other structure accommodating limited rotation of the blocker member relative to said other structure for accommodating positioning of said blocker member in blocking relationship with respect to said clutching sleeve when said structures are rotating at relatively different speeds and for disposing said blocker means out of said blocking relationship thereby to accommodate shift of said clutching sleeve as aforesaid when said structures are rotating at approximately the same speed, and a blocker energizing member having relatively angularly disposed portions one thereof extending into said hollow part and engaged therewith for rotation with said one structure and another portion thereof engaging said blocker member for maintaining the same in assembled position and in said pressure energizing engagement with respect to said friction surface whereby to induce said positioning of said blocker member in said blocking relationship prior to clutching shift of said clutching sleeve.

JOHN G. TYKEN.